Nov. 11, 1969  F. MASSA, JR  3,478,309
ELECTROACOUSTIC TRANSDUCER WITH MULTIPLE BEAM CHARACTERISTICS
Filed April 10, 1968  2 Sheets-Sheet 1

Inventor
FRANK MASSA JR.

Louis Bernat
Attorney

United States Patent Office 3,478,309
Patented Nov. 11, 1969

3,478,309
ELECTROACOUSTIC TRANSDUCER WITH
MULTIPLE BEAM CHARACTERISTICS
Frank Massa, Jr., Cohasset, Mass., assignor to Dynamics
Corporation of America, Massa Division, Hingham,
Mass.
Filed Apr. 10, 1968, Ser. No. 720,175
Int. Cl. H04b 13/00
U.S. Cl. 340—9                                    11 Claims

ABSTRACT OF THE DISCLOSURE

A number of novel underwater transducer elements are arranged in a field symmetrically disposed about horizontal and vertical axes. Transformers, individually associated with the four quadrants formed by the axes, are individually coupled to peripherally and centrally located transducer elements. In addition, each transformer is also coupled to the centrally located transducer elements in one adjacent quadrant. By selecting the number of turns on the various transformers, the central transducer elements may be driven at one amplitude and the peripheral transducer elements at another amplitude. The resulting structure provides direction and steering information with respect to the source of sonic energy.

---

This invention relates generally to sonic energy transducers, and more particularly to transducers for operation under water.

The invention is particularly concerned with an improved method for constructing transducers having a relatively sharp directional beam pattern, during its operation, with secondary lobes which are reduced in magnitude from those of a simple unshaded piston radiating surface. My invention is particularly useful for transducers in which the linear dimensions of the radiating surfaces are generally larger than two or three times the wavelength of sound in the medium of its frequency of operation. The invention is also particularly useful if a transducer is required to have multiple beam patterns when operating in the receive mode in order that acoustic signals received by the multiple beams will generate improved electrical signals, as compared with signals generated by prior art transducers. These signals are used for target location or acoustic steering purposes such as, for example, in connection with the operation of a guidance system in an acoustic torpedo.

My invention is particularly useful in connection with transducers required to have fairly sharp directional beam patterns. Therefore, it is mostly concerned with transducers having a piston-like radiating surface in which the overall transverse linear dimensions of the radiating surface are greater than two or three times the wavelentgh of sound.

An object of this invention is to improve the beam patterns of a transducer.

Another object of my invention is to improve the phase relationship between the received signals among the different sections of a multiple beam transducer. Thus, the transduced will be more accurate when used with equipment for interpreting the direction from which the sound is arriving with respect to the normal axis of the transducer. This accuracy improves the reliability of the steering information which is derived from the phase comparison of the signals received by the different sections of the transducer.

A still further object of my invention is to sharpen the beam angle of the sections of a subdivided multi-beam transducer, as compared with the beam angle conventionally realized in the prior art conventional type of sectionalized transducers.

Yet another object of my invention is to reduce the secondary lobes in the beam patterns of the subdivided sections of a multiple beam transducer.

Another object of my invention is to provide a low-cost multiple beam transducer which is extremely rugged and highly reliable in its operation.

A still further object of my invention is to design a multiple beam transducer in which improved multiple receiving beam patterns may be formed from a simple arrangement of transducer elements and transformers having a symmetrical construction of multiple windings.

These and other objects of the invention will become evident in the following detailed description. The novel features which are characteristic of the invention are set forth with particularity in the appended claims. The invention itself, however, both as to its organization and method of operation as well as advantages thereof will best be understood from the following description of several embodiments thereof when read in connection with the accompanying drawings, in which:

Figure 1:
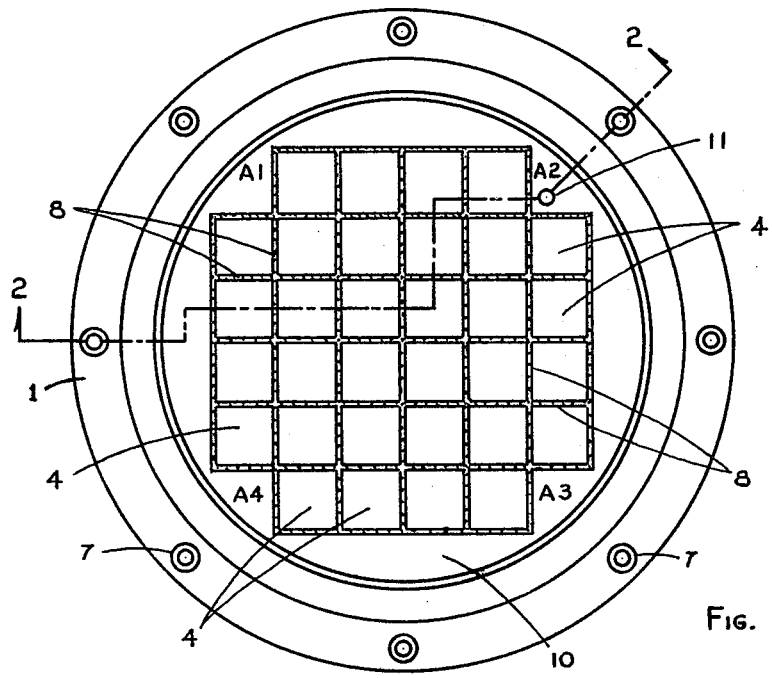
FIG. 1 is a plan view of a transducer incorporating one illustrative embodiment of my invention in which a sound transparent rubber window has been removed.
Figure 2:
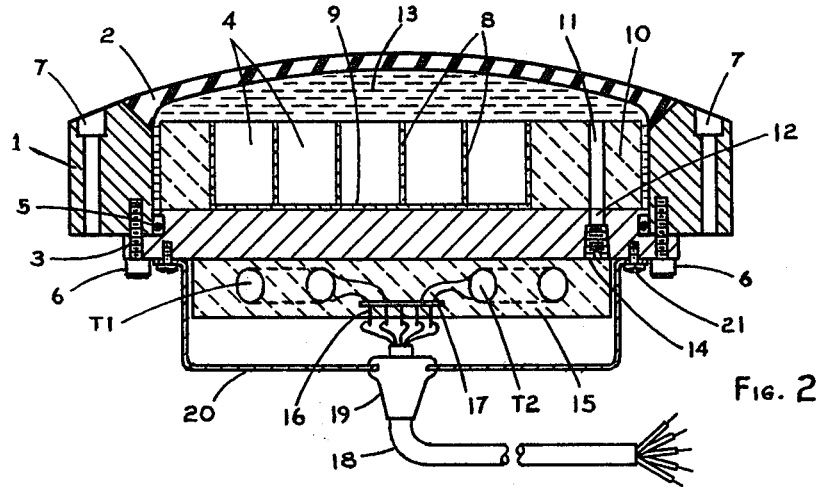
FIG. 2 is a sectional view, taken along the line 2—2 of FIG. 1, and which includes the sound transparent rubber window which was removed in FIG. 1.

Referring more specifically to the figures, FIGS. 1 and 2 show an illustrative transducer construction embodying one form of the present invention. A housing 1 is shown as a rigid, heavy-walled cylindrical ring which may be fabricated from a suitable metal such as aluminum or stainless steel. A sound transparent rubber window 2 is molded to close one end of the ring-type housing, as illustrated in FIG. 2. A rigid disc 3 is used as a mounting plate having a plurality of transducer elements 4 assembled thereon. Disc 3 also serves as a closure for the rear of the housing, a seal being formed by means of the radial O-ring seal 5 when the disc 3 is attached to the housing by means of the bolts 6, as shown. The counter-bored holes 7 are provided around the periphery of the housing 1 to serve as clearance for bolts or screws which are used when attaching the transducer to another structure.

Figure 5:
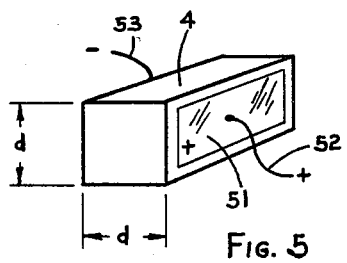
FIG. 5 is a perspective view of a polarized piezoelectric ceramic bar which is used as the transducer element in one preferred form of my invention.

The transducer elements 4 have rectangular polarized ceramic plates utilizing any of the well-known piezoelectric materials such as lead zirconate titanate. For the purpose of illustration, I have chosen ceramic bars with a square cross section of dimension $d$ as shown in FIG. 5. My choice of polarization for the illustration utilizes the longitudinal vibration of the bar which is at right angles to the electric field. The electrode surfaces may consist of fired silver, such as is conventionally used in the art. The positive electrode is shown as 51 in FIG. 5. The negative electrode is on the opposite face of the ceramic bar which is not visible in the perspective view. The positive electrical connection is indicated by the wire 52 which may be soldered to the electrode 51. The wire 53 represents the negative potential lead which is soldered to the negative electrode on the face of the bar not visible in FIG. 5.

With the ceramic bar illustrated in FIG. 5, mechanical vibrations will take place along the axial length of the bar when electrical oscillations are impressed on the conductors 52 and 53. Although I have preferred to use the simple polarized ceramic bar illustrated in FIG. 5 for my electroacoustic transducer elements, I could use a variety of other types of transducer elements without departing from the basic teachings of my invention. For example, I could replace the ceramic bar by ammonium di-hydrogen phosphate 45° Z-cut plates, which are well known in the art. Or, I could use individual transducer element assemblies having a vibratile piston surface driven by a transducer elements which is bonded between the vibratile piston surface and an inertial mass element which completes the assembly.

Returning to FIGS. 1 and 2, I have illustrated an array of transducer elements which are grouped into four separate symmetrical quadrants A1, A2, A3, and A4 about the vertical and horizontal center lines. For separating the sides of each vibratile element 4 from making direct contact with its neighbor, I employ a thin layer of corprene 8 which is a well-known low acoustic impedance material. Preferably, this corprene is cemented to the ceramic surfaces by means of epoxy or any other suitable cement. Similarly, I employ a flat sheet of corprene 9 to isolate the bottom ends of the vibratile elements and keep them from being coupled directly to the rigid disc or plate 3.

Separate electrical connections are made to each of the four quadrants A1, A2, A3, and A4. The wiring is not shown in FIGS. 1 and 2 because it would unduly complicate the drawing and would not add any useful information. The special manner in which the various elements in the quadrants are electrically connected is an important part of this invention and will be discussed in connection with a particular preferred arrangement to be shown in FIGS. 3 and 4.

To increase the ruggedness of the assembly, I encapsulate the outer periphery of the assembled transducer elements with one of the well-known potting compounds, such as epoxy 10. The potting compound is preferably poured into a cylindrical form which is located on the base plate 3 after assembling the elements 4 and completing their wiring. When the potting compound sets, it consolidates the entire array into a rugged solid structure integral with the base plate 3. All the interconnecting wires are encapsulated so that they will not be subject to vibration during rough handling of the transducer. When the potting compound 10 is poured, an opening 11 is provided through the compound which communicates with the opening 12 in the plate 3.

After completing the mechanical assembly of the transducer by attaching the base plate 3 to the housing 1, the space between the radiating surfaces of the transducer elements and the rubber window 2 is filled through the opening 12 with a sound conducting fluid 13, such as castor oil or silicone. After filling, a sealing screw 14 is used to complete the assembly.

Electrical conductors establish separate electrical connections to the four quadrants. These conductors are soldered to insulated feed-through terminals which are placed through the wall of the plate 3. Since feed-through terminals are well known in the art, they are not shown in the drawing. Transformers, such as illustrated by T1 and T2, are connected to the quadrant wiring, as will be described later, after which they are encapsulated to the rear of the plate 3 by an epoxy compound 15, as illustrated in FIG. 2. Electrical terminals 16, mounted on terminal board 17, establish electrical connections to the transformers. The insulated terminal board 17 is submerged in the potting compound 15, as shown, with the terminal tips projecting beyond the surface of the epoxy. A multiconductor cable 18 is molded to a rubber grommet 19 which is located through a hole in the cover 20. After the ends of the cable conductors are soldered to the terminals 16 in their proper sequence, as will be described later, the cover 20 is fastened to the plate 3 by means of the screws 21 to complete the transducer assembly, as shown.

During the assembly of the quadrants, I may provide electrical shielding between the quadrants, if required, by placing a thin metal foil between two thin layers of corprene. Then, the corprene-metal sandwich is substituted for the solid corprene separator which is shown between the transducer elements along the vertical and horizontal center lines of the drawing in FIG. 1. Whether or not this interquadrant shielding is required depends on the application of the transducer and especially on the electrical background noise that exists in the vicinity of the transducer during its operation.

I have indicated the use of the polarized ceramic bar, as shown in FIG. 5, as the transducer element in the illustrative embodiment of my invention. Of course, it should also be understood that I may substitute any other type of electroacoustic transducer element to achieve the same purpose, as disclosed in the invention. The element as shown in FIG. 5, for example, has a square cross section with a dimension $d$ along each of its equal sides. The electrodes are placed on the side faces of the plate, as shown and previously described. It would also be possible, if I so desired, to employ electrodes on each of the end faces of the ceramic bars instead of the side faces as shown. The electrical field and polarization would then be parallel to the axis of vibration in the transducer illustrated in FIG. 1. For this latter case, the electrode surfaces on the radiating end faces of the ceramic element would be in direct contact with the oil inside the transducer, and the electrodes on the opposite nonradiating vibrating end faces would be in contact with the corprene surface 9 in FIG. 2.

It should be also understood that the single ceramic bar illustrated in FIG. 5 could itself be a subassembly of two or more smaller bars. This multi-bar arrangement would not change the mechanical vibrating system but the subdivision of the element into a multiplate assembly would achieve a lower electrical impedance because of the parallel electrical connection of the thinner electroded sections. This method of subdividing piezoelectric plates in groups of thinner plates for the purpose of reducing the electrical impedance of the structure and thereby reducing the magnitude of the operating voltage is well known in the art and does not form a part of this invention; therefore, no specific details of such sub-divided assemblies are illustrated in the drawings as it would be superfluous to this disclosure.

Figure 3:
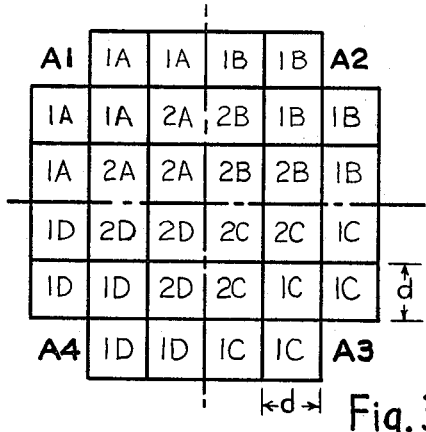
FIG. 3 is a schematic illustration of one preferred arrangement of transducer receiver elements which are grouped into four symmetrical quadrants which may be independently used for forming four separate beam patterns. At this receiver, the phase difference received between horizontally and vertically displaced sets of beams may be used for horizontal or vertical steering information.

FIG. 3 shows one of several possible specific arrangements which I may employ for illustrating one of the important objects of this invention. This arrangement improves the sharpness of the beam patterns in the directional response characteristics of the separate quadrant grouping of elements within the transducer. The arrangement also improves the phase relationship between the acoustic signals received by the different sections of the transducer. This relationship provides more accurate information as to the direction of the acoustic target with respect to the axis of the transducer.

FIG. 3 is a schematic plan view showing a transducer employing four separate identical groupings of vibratory elements arranged in four symmetrical quadrants A1, A2, A3 and A4 separated by the vertical and horizontal center lines in the drawing. Within each quadrant the transducer elements are arranged in two identical subgroupings as illustrated. For example, in the quadrant A1, there is a group of five elements labeled 1A surrounding a smaller group of elements labeled 2A. In the other quadrants, the groupings are similar and are labeled 1B and 2B respectively for quadrant A2, 1C and 2C for quadrant A3 and 1D and 2D for quadrant A4. For the example chosen, eight transducer elements are shown in each quadrant of the assembly. These elements are electrically connected to four transformers having multiple windings as illustrated in the wiring diagram of FIG. 4.

Figure 4:
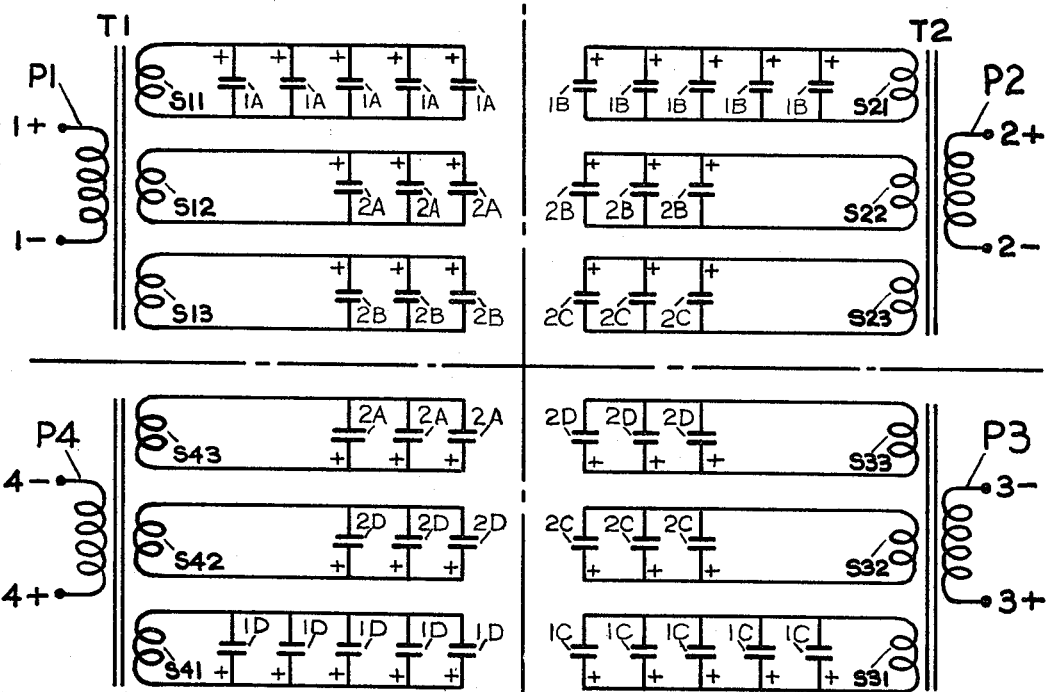
FIG. 4 is a schematic wiring diagram showing one preferred form of connections for the sectionalized array illustrated in FIG. 3.

In FIG. 4 the transformers T1, T2, T3 and T4 are respectively associated with the quadrants A1, A2, A3 and A4 of FIG. 3. Also, for the illustration shown, each transformer has identical sets of windings because each quadrant has an identical grouping of transducer elements, and it is desirable to preserve the electrical and acoustic symmetry of the four quadrants. The transformer T1 has a primary coil P1 with primary terminals 1+ and 1—, as shown; similarly the transformer T2 has a primary winding P2 and the terminanls 2+ and 2—, and transformers T3 and T4 have primaries P3 and P4 respectively with primary terminals 3+ and 3— and 4+ and 4—. The transformer T1 has three secondary windings S11, S12 and S13. The transformer T2 has secondary windings S21, S22 and S23. The transformer T3 has secondary windings S31, S32 and S33, and transformer T4 has secondary windings S41, S42 and S43 as illustrated.

For the symmetrical arrangement illustrated, all of the transformers are identical to one another. Each has the same number of primary turns as well as the same number of turns on each of the equivalent secondary windings. For example, all of the windings S11, S21, S31 and S41 are alike, and the windings S12, S22, S32 and S42 are alike. The secondary windings S13, S23, S33 and S43 are not only alike, they are also identical to the secondary windings S12, S22, S32 and S42.

The outer group of transducer elements, labeled 1A in quadrant A1, are connected electrically in parallel across the terminals of secondary S11, as illustrated. The three elements labeled 2A are connected together, and the group is connected across the secondary S12, as illustrated. In the other quadrants, the corresponding two groups of transducer elements are similarly connected, as described in connection with the quadrant A1. Each group of transformers is connected across the corresponding secondaries of the transformers associated with each quadrant as illustrated in FIG. 4. Thus, each transformer connects the two electrically separated subgroups of transducer elements from each quadrant, via its associated transformer windings. In addition, there is a third secondary winding in each transformer for making a connection to a group of elements which are in a neighboring quadrant; for example, across the terminals of secondary winding S13 of transformer T1 are connected the elements 2B from the quadrant A2. Similarly across the secondary S23 of transformer T2 are connected the elements 2C from the quandrant A3. Across the secondary S33 of transformer T3 are connected the elements 2D from the quadrant A4, and across secondary S43 of transformer T4 are connected the elements 2A from the quadrant A1.

In order to reduce the magnitude of the secondary lobes, the elements 2A, 2B, 2C and 2D are driven at higher amplitude than the elements 1A, 1B, 1C and 1D. The ratio of amplitudes may be adjusted by selecting the desired number of turns on the secondary S11 as compared to the number of turns on the secondary S12. A large reduction in the magnitude of the secondary lobes (of the order of 10 db or more) may be achieved if the amplitude of the elements 2A, 2B, 2C and 2D are adjusted to be in the order of two to three times the amplitude of the elements 1A, 1B, 1C and 1D. For example, assume that the desired amplitude ratios are set to be 2 to 1 and that all of the transducer elements in the array are identical, which would be very advantageous for reducing the manufacturing cost of the transducer. Then it is necessary to design the transformers such that the voltage appearing across the terminals S12, S22, S32 and S42 is twice the magnitude of the voltage appearing across terminals S11, S21, S31 and S41 when the primary windings P1, P2, P3 and P4 are connected to a common electrical power source. Since secondary S13 is the same as secondary S12, the voltage developed across its terminals will be the same as the voltage across winding S12 and therefore twice the voltage appearing across the secondary S11. As it can be seen in FIG. 4, all of the electrical connections within the system are perfectly symmetrical and balanced with the same number of transducer elements connected across each of the corresponding secondaries as illustrated in the drawing.

Figure 6:
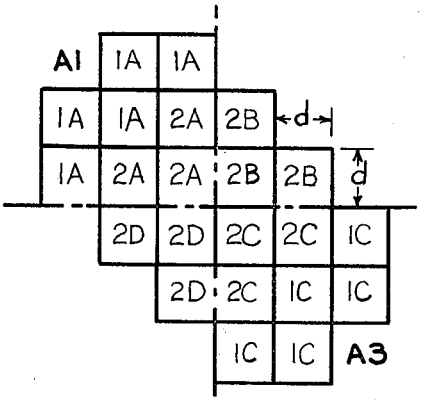
FIG. 6 is a schematic diagram showing the effective increase in the size of the quadrants A1 and A3 which is realized by employing the method of electrical connections illustrated in FIG. 4.

When the transducer array illustrated in FIGS. 3 and 4 is driven as a projector, the primary windings P1, P2, P3 and P4 are connected in parallel to a common source of electrical power. It will be evident that for the assumed voltage ratios of 2 to 1, the entire transducer array will be driven with all the peripheral elements 1A, 1B, 1C and 1D operating at one-half the amplitude of the inner group of elements 2A, 2B, 2C and 2D. When the transducer is operating in the multiple beam receiving mode, the four transformer primaries are disconnected from the common power source and separated electrically from each other, Then, it can be seen that each transformer will actually be effectively connected to its own quadrant of elements plus an additional group of elements which are physically located in its neighboring quadrant. As an illustration, FIG. 6 shows the schematic arrangement of the actual transducer elements which will be connected to the transformer T1 and also the elements which will be connected across the transformer T3 when the transformer primaries P1 and P3 are electrically separated. The elements shown above the horizontal center line in FIG. 6 are connected to the transformer T1 and the elements below the horizontal center line are connected to the transformer T3. It can also be seen from the schematic diagram in FIG. 6 that the lower group of elements connected across the transformer T3 are displaced to the right of the vertical center line and the upper group of elements connected to the transformer T1 are displaced to the left of the vertical center line. For the assumed amplitude array shading of 2 to 1 as described, the total horizontal displacement between the acoustic centers of the upper and lower groups of elements will be equal to $d$, where $d$ is the dimension of the square end face of the transducer element.

If an acoustic signal arrives from a direction along the normal axis perpendicular to the plane of the transducer face, the electrical signals generated in the transformer T1 will be of the same phase as the signals generated in the transformer T3. When the direction of the acoustic signal arrives from an axis inclined toward the right hand side of the schematic assembly pictured in FIG. 6, the acoustic signal will arrive first at the surfaces of elements connected to transformer T3, and the phase of the voltage generated in T3 will lead the phase of the voltage generated in T1. The phase difference between the two signals will therefore be a measure of the direction along which the acoustic signal is arriving with respect to the normal axis of the transducer.

It is obvious that the phase information will be accurate only up to angles of arrival within which the phase shift between the signals from T1 and T3 remains under 180°. Beyond this angle, the phase difference will give false information because of the phase reversal of the signals Therefore, it is also obvious that as the displacement of the acoustic centers of the separate transducer assemblies increases, there is a reduction of the total angle within which accurate phase information is derived for determining the direction of arrival of a received acoustic signal.

During the receive mode of operation, there are two desirable effects for improving the receiving beam patterns. These effects result from the novel use of the auxiliary third secondary windings for connecting elements from the neighboring quadrants of the transducer array. In the conventional multibeam transducer where the received signals are compared between the actual true adjacent quadrants, the beam pattern for each quadrant is much broader than the beam pattern realized by the novel electrical connection just described in connection with FIG. 6. In the conventional use of the actual side by side quadrants, the distance between the acoustic centers of each pair of quadrants is generally much greater than one wavelength. If the overall dimension of the array in FIG. 3 is typically in the order of approximately 4 wavelengths of sound being radiated, the dimensions along the edge of each square in the array will be approximately ⅔ wavelength. The total beam angle for the complete array of such dimension will be approximately 15° at the 3 db down points. If the beam angle is to be somewhat increased to approximately 20°, for example, the total dimension of the array shown in FIG. 3 will be reduced to approximately 3 wavelengths, and the dimension along the edge of each transducer element will be approximately ½ wavelength. On the other hand, if a somewhat sharper beam is required, for example, in the neighborhood of 10° to 12° at the 3 db down points, the overall dimension of the array will be 5 to 6 wavelengths, in which case, the dimension of each element will approach one wavelength on a side. Therefore, for the particular configuration of elements as illustrated in FIG. 3, to obtain the range of beam angles indicated, the range of linear dimensions of the cross section of each vibratile element will be between ½ wavelength and one wavelength.

For an assumed average condition of about ⅔ wavelength for the linear dimensions of the individual transducer elements illustrated in the array of FIG. 3 and for an assumed shading of 2 to 1 between the No. 1 elements and the No. 2 elements in the array, the acoustic centers between the two side by side simple quadrants A1 and A2 will be separated by 1.8 wavelengths. For this condition of separation, the phase difference between the signals generated in each of the side by side quadrants will exceed 180° at angles of arrival of the acoustic signal greater than 17° off the normal axis. This means that beyond this angle, where the phase difference exceeds 180°, the steering information derived from the relative phase of the received signals will become ambiguous and will actually appear to shift the direction of arrival of sound to the wrong side of the transducer, thus limiting the scope of the transducer.

By utilizing the novel electrical connections as shown in FIG. 4 and for same assumed average condition of ⅔ wavelength for the sides of the transducer elements, the acoustic centers between the expanded quadrant A1 and the expanded quadrant A3 (as illustrated in FIG. 6) will become closer such that the separation is reduced to about ½ the separation of the conventional quadrant separation. The total angle within which there will be no ambiguity in phase comparison will be approximately doubled over that indicated in the previous example. This is a very considerable improvement in the beam steering capability of the new transducer as described.

The received signals from the expanded quadrants A1 and A3 as illustrated in FIG. 6 may be useful for horizontal steering information if the new transducer is used in an acoustic torpedo. In other words, the relative phase of the signals appearing across the transformers T1 and T3 will determine whether the acoustic signal is arriving from the left or right sides of the transducer axis. A similar comparison of the relative phase of the received signals may simultaneously be made in the vertical direction by comparing the signals appearing across the transformers T2 and T4. These transformers represent the vertical receiving patterns which are similar to the horizontal patterns resulting from the representation in FIG. 6. However, the entire schematic layout will be effectively rotated 90° clockwise so that quadrant No. 1 will become quadrant No. 2, and quadrant No. 3 will become quadrant No. 4. Another advantage of the special transformer connection, which adds elements from adjacent quadrants when operating in the receive mode, is that the effective size of the quadrant is increased. The beam width is thereby effectively reduced to improve the signal to noise ratio of the transducer.

Although I have described my invention with a specific configuration of elements as illustrated in FIG. 3, I may, of course, increase or decrease the number of elements which I have shown. I may also substitute the general design which I have shown, which includes simultaneous horizontal and vertical beam comparison as represented by the four quadrant layout of FIG. 3, by a simpler two section side by side design which will permit beam comparison in only a single plane. The simpler two sector arrangement, using only two transformers, will be sufficient for applications which require the direction of an acoustic signal or steering information in only one plane. I may also change the geometric configuration from the simple geometric pattern illustrated in FIG. 3 without changing the fundamental principle of my basic invention. The illustration of FIG. 3 represents only one of several configurations. It is a particularly satisfactory, low cost arrangement in which a relatively small number of identical transducer elements are combined in four symmetrical combinations with a very simple electrical connection and shading to achieve important improvements in the performance characteristics of multibeam transducers adaptable for phase comparison among the various sections for the determination of the direction of a sound signal with respect to the normal axis of the transducer.

While there has been shown and described several specific illustrative embodiments of the present invention, it will, of course, be understood that various modifications and alternative constructions may be made without departing from the true spirit and scope of the invention. Therefore, the appended claims are intended to cover all such modifications and alternative constructions as fall within their true spirit and scope.

I claim as my invention:

1. In combination in an electroacoustic transducer, a plurality of vibratile elements, each element having a longitudinal axis and a pair of vibratile end surfaces located at opposite ends of said longitudinal axis, said plurality of vibratile elements arranged in a plurality of separated primary groups, each of said separated primary groups of vibratile elements divided further into at least two electrically independent subgroups, multiple electrical conductor means separately connected each of said subgroups of said vibratile elements, a plurality of electrical transformers, each transformer having a primary winding and a plurality of secondary windings, a first secondary winding in one of said transformers connected electrically to a first subgroup within one of said primary groups of vibratile elements, a second secondary winding within said same transformer connected to a second subgroup of vibratile elements within the same primary group of vibratile elements, a second secondary winding within the same transformer connected to a second subgroup of vibratile elements from a different primary group of vibratile elements.

2. The invention in claim 1 characterized in that said plurality of vibratile elements are arranged into four separate primary groups located in adjacent symmetrical quadrants separated by two right angle center lines, each separate primary group of said vibratile elements are further divided into two electrically independent subgroups of vibratile elements, the first of said subgroups in each quadrant comprise the vibratile elements farthest removed from the common center point of the four quadrant groups, and the second of said subgroups in each quadrant comprise the vibratile elements closest to the common center point of the quadrant groups.

3. The invention in claim 2 further characterized to include four identical transformers, one each of said transformers is associated with one each of the said four primary groups of vibratile elements, each of said transformers includes a primary winding and three secondary windings, the first secondary winding from one of the said transformers is electrically connected to the first of the said subgroups of vibratile elements located within one primary group of elements, the second secondary winding from said transformer is connected to the said second subgroup of vibratile elements located within the same primary group of elements, and the third secondary winding from said transformer is connected to a second subgroup of vibratile elements located within an adjacent primary group of elements from a neighboring quadrant.

4. The invention in claim 3 further characterized in that the turns ratio in said transformers are such that the voltage delivered to said first secondary windings when the primary is connected to a source of electrical power is less than the voltage delivered across the said second secondary windings.

5. The invention in claim 4 further characterized in that the voltage delivered across the third said secondary winding is equal to the voltage delivered across said second secondary winding.

6. In combination in an electroacoustic transducer, a housing structure having a peripheral wall portion and an opening on at least one end of said housing, a sound transparent window sealed to said wall portion and covering said opening in said housing structure, a plurality of transducer elements each having a longitudinal axis and a vibratile end face at right angles to said longitudinal axis, said transducer elements characterized in that they are capable of converting electrical oscillations into mechanical vibrations along said longitudinal axis and further characterized in that said longitudinal vibrations are transferred to said vibratile end faces, said vibratile end faces of said plurality of transducer elements arranged in at least two separated symmetrical primary groups, each of said separated primary groups further subdivided into at least two electrically independent subgroups, the first of said subgroups being farthest removed from the common center of said separated symmetrical groupings, the second of said subgroups being closest to the common center of said symmetrical groups, a plurality of electrical conductors separately connecting each of said subgroups to separate electrical terminals, a plurality of transformers, each having a primary winding and three secondary windings, one of said transformers connected with its first secondary winding to the terminals from the first of said subgroups within one of said separated primary groups of transducer elements, the second secondary winding from said transformer connected to the terminals from the second of said subgroups within the same first primary group of transducer elements, the third secondary winding from said transformer connected to terminals from the second of said subgroups of transducer elements located within the second of said separated symmetrical primary groups of transducer elements, and acoustic coupling means between said vibratile end faces and said sound transparent window.

7. The invention in claim 6 characterized in that the turns ratios of the transformers are such that the voltages appearing across the first said secondary windings is less than the voltages appearing across the said second and third secondary windings when the primary windings of said transformers are connected to an electrical power source.

8. The invention in claim 7 further characterized in that the voltages appearing across said second and said third secondary windings is in the approximate range of two to three times the voltage appearing across the first said secondary winding when the primary windings of said transformers are connected to a source of electrical power.

9. In combination in an electroacoustic transducer, a housing structure having a peripheral wall portion, a sound transparent window sealed to one end of said peripheral wall portion, a rigid base portion attached to the opposite end of said housing structure, said base portion being characterized in that it has at least one flat surface, and further characterized in that said flat surface faces the interior of said housing structure, and still further characterized in that said flat surface lies in a plane at right angles to the normal axis of said housing structure, a plurality of transducer elements each having a longitudinal axis and a pair of end faces at right angles to said longitudinal axis, said transducer elements being characterized in that they are capable of converting electrical oscillations into mechanical vibrations along said longitudinal axis, and further characterized in that said mechanical vibrations are efficiently transferred to at least the first of said pair of end faces, said plurality of transducer elements being mounted on the flat surface of said base portion, acoustic coupling means between said vibratile end faces and said sound transparent window, said transducer elements being symmetrically arranged into four separate identical primary groups of elements located in adjacent symmetrical quadrants defined by two right angle center lines, each separate primary group of said transducer elements being divided into two electrically independent subgroups of transducer elements, the first of said subgroups in each quadrant comprising the transducer elements farthest removed from the common center point of the four quadrant groups, and the second of said subgroups in each quadrant comprising the transducer elements closest to the common center point of the symmetrical quadrant groups, a plurality of electrical conductors separately connecting each of said subgroups to separate electrical terminals, and a plurality of transformers, each having a primary winding and three secondary windings, at least one of said transformers being connected via its first secondary winding to the terminals of the first of said subgroups within one of said separated primary groups of transducer elements, via its second secondary winding to the terminals of the second of said subgroups within the same first primary group of transducer elements, and via its third secondary winding to terminals of the second of said subgroups of transducer elements located within a primary group of transducer elements in a neighboring quadrant.

10. The invention in claim 9 characterized in that the turns ratios of the transformers are such that the voltages appearing across the first said secondary windings is less than the voltages appearing across the said second and third secondary windings when the primary windings of said transformers are connected to an electrical power source.

11. The invention in claim 10 further characterized in that the voltages appearing across said second and said third secondary windings is in the approximate range of two to three times the voltage appearing across the first said secondary winding when the primary windings of said transformers are connected to a source of electrical power.

References Cited

UNITED STATES PATENTS 2,844,809   7/1958   Batchelder _____ 340—10
2,943,297   6/1960   Steinberger et al. _____ 340—9

RODNEY D. BENNETT, JR., Primary Examiner
BRIAN L. RIBANDO, Assistant Examiner